United States Patent Office

3,527,614
Patented Sept. 8, 1970

3,527,614
METHOD OF MANUFACTURING ELECTRODES
Renno Jacob Elema and Marinus Dirk Wijnen, Emmasingel, Eindhoven, Netherlands, assignors, by mesne assignments, to U.S. Philips Corporation, New York, N.Y., a corporation of Delaware
No Drawing. Filed Sept. 26, 1967, Ser. No. 670,801
Claims priority, application Netherlands, Sept. 27, 1966, 6613587
Int. Cl. H01m 35/06, 35/18
U.S. Cl. 136—75                                   4 Claims

ABSTRACT OF THE DISCLOSURE

A method of manufacturing an electrode for a battery or fuel cell. A porous electrode skeleton, e.g., nickel gauze on which nickel powder is sintered is placed between and in contact with two solutions which react and form a precipitate, e.g., nickel hydroxide. In a preferred embodiment the porous skeleton and solutions are placed in an electric field produced by two spaced electrodes so that a current flows which increases the rate of precipitation.

---

The invention relates to a method of manufacturing electrodes consisting of a porous electrode skeleton filled with an electrochemically active compound, for example, electrodes for an alkaline accumulator or for a fuel cell.

One method which has already been used on a large scale for a long time requires that the porous electrode skeleton consisting, for example, of nickel-gauze on which nickel powder be sintered is impregnated with a solution of one reaction component and then contacted with a solution of a second reaction component with which the active compound is obtained by precipitation. These processes have to be repeated from 3 to 7 times in order to obtain a desired quantity of active substance in the skeleton. In addition, between each two treatments the electrodes have to be rinsed thoroughly and then dried. Consequently this method is rather laborious and results in large drag-out losses. In addition, the temperature during precipitation and drying is rather critical. For example, the danger exists of a reduction of the activity of the compounds in question during drying at too high a temperature. In principle the method is not suitable for continuous application. Another method is also known according to which the active substance is introduced by electrolysis. The electrode skeleton is connected as the cathode in a solution of the nitrate of, for example, nickel or cadmium. Because nitrate is reduced, the pH of the solution increases and the hydroxides of the metals in question precipitate in the electrode skeleton. This method is very time-consuming; if the reaction is accelerated more precipitation of the active substance on the surface of the skeleton occurs than in the pores thereof.

According to the invention, the manufacture of electrodes by precipitation of an active substance in a porous electrode skeleton is carried out in that the electrode skeleton is arranged between and in contact with two solutions each containing a reaction component from which the active substance is formed by precipitation.

The two reaction components in question enter the skeleton, meet one another and form the precipitate.

According to a preferred embodiment of the method according to the invention the speed may be increased considerably if the porous electrode skeleton and the surrounding solutions are arranged in a suitable electric field so that a current flows which is supported mainly by the precipitate-forming ions, cations being located on the anode side and the anions which are to react with the cations to form the active substance in question being arranged on the cathode side. It has been found, for example, in the case of nickel and cadmium hydroxides, that a precipitate is obtained which surprisingly does not contain too much water so that it is not necessary to dry it and which has an excellent reactivity, that is to say, that as an active substance it gives the highest possible electrochemical yield. The precipitate is so compact that the skeleton can be filled in one process.

When an electric field is used it is of advantage to choose electrodes which form ions during the electrode reaction occurring therein, which ions are involved in the formation of the active substance.

It has been found that when using the method according to the invention a precipitate is obtained which generally is precipitated asymmetrically in the skeleton in that only one of the reaction components is transported by the precipitate formed. This has for its result that on the side of that reaction component which is transported by the precipitate, a non-filled layer remains while the precipitate on the opposite side of the electrode skeleton grows out of the skeleton when the diffusion and/or migration is continued.

According to an elaborate embodiment of the method according to the invention, the skeleton is previously filled with a solution of that reaction component which does not grow through the precipitate. Also as a result of hydrostatic differential pressures, disturbing convection currents occur in a practical performance of the method. To prevent this the electrode skeleton may previously be impregnated with a solution which is concentrated after filling, for example, a solution of a nickel salt which also contains agar-agar. It has furthermore been found that the method can be considerably improved by providing against one of the sides of the electrode skeleton an ancillary diaphragm which readily passes the reaction components in question. The ancillary diaphragm is preferably arranged against that side of the electrode skeleton where the solution of that reaction component which is transported by the precipitate is located.

An example of such an ancillary diaphragm which after completion of the electrode is removed, is cellophane. When an electric field is used, it has been found of advantage to choose an ancillary diaphragm which electrically is a conductor since otherwise oxygen gas evolves between the electrodes and the ancillary diaphragm in a disturbing manner. An example of such an ancillary diaphragm is an electrode skeleton which is filled with an alkali-hydroxide solution thickened by agar-agar.

In the manufacture of a nickel-oxide-hydrate electrode difficulties sometimes occur in that the nickel anode is passivated, oxygen gas evolving and hydrogen ions being conveyed into the solution. This latter again requires that the formation of the active precipitate be hindered. The passivation may be prevented in known manner by adding chloride to the electrolyte solution which surrounds the anode, for example, in a quantity of the order of 1 m. In that case, however, a diaphragm must also be arranged between the anode and the electrode skeleton which ensures that no chloride ions can penetrate into the electrode skeleton or in the electrolyte solution of the cathode side. For this purpose is preferably used a cation-selective diaphragm, that is to say a diaphragm which contains fixed negative groups.

During the precipitation of the active substance in the electrode skeleton in manufacturing the electrode, the resistance thereof for the ion transport gradually increases. As a result of this the skeleton may gradually begin to behave as the cathode on one side and as the anode on the other side. This means that the formation of active substance is disturbed which may be prevented by performing the process under the influence of the electric field and using not too high a voltage between the two electrodes. The above drawback of the electrochemical taking part of the skeleton may also be mitigated by coating the skeleton, prior to the impregnation, with a very thin film of an insulating substance which is removed again after filling. A dilute solution of nitrocellulose has been used successfully for this purpose.

An even more compact precipitate may be obtained in the electrode skeleton and consequently an even larger capacity per volume by turning the skeleton relative to the cathode and anode once or several times during the introduction under the influence of an electric field. However, this may also be achieved without having to turn the skeleton by dissolving in the solution of the reaction component, which is transported by the precipitate, a salt, for example, $KNO_3$.

The method according to the invention may advantageously be performed continuously. Sintering tape is for that purpose passed between two endless tapes in such manner that the sintering tape is forced on both sides against the foils which are impregnated with electrolyte liquids. These foils in turn contact the electrodes between which the electric field is applied.

Another embodiment of a device for the continuous performance of the method according to the invention comprises a cylindrical drum which rotates about the axis of the cylinder the wall of which consists of porous material and which is filled with a solution of one of the reaction components. The porous cylinder wall forms the above-mentioned ancillary diaphragm. This drum rotates in a container which is filled with the solution of the other component. The sintering tape is passed along the porous wall of the drum through guide rollers. In the liquid in the drum the associated one electrode is arranged and the opposite electrode is arranged in the liquid in the container.

The invention will now be described in greater detail in the following illustrative examples.

EXAMPLES (1) Two wafers having a diameter of 30 mms. and consisting of nickel gauze on which nickel powder is sintered to a total thickness of 0.6 mm. to a porosity of 82% are clamped in a polytetrafluoroethylene partition in an electrolysis vessel. The free part of the surface has a diameter of 25 mms. One wafer is previously impregnated with 1 molar $Ni(NO_3)_2$-solution the other comprises a 0.1 m. GOH solution thickened with 3% by weight of agar-agar. The electrolysis vessel is filled on the side of said diaphragm with a 2 m. KOH-solution and on the other side with 1 molar $Ni(NO_3)_2$-solution. In the $Ni(NO_3)_2$-solution an envelope of polymethyl methacrylate is arranged in which three apertures having a total surface area of 25 sq. cms. are provided which are sealed with a cation-selective diaphragm ("Permaplex C-20"). Inside the envelope a nickel electrode of 40 sq. cms. is arranged and a 1 molar $NiCl_2$-solution. The KOH-solution contains a nickel-plated brass electrode having a surface area of 100 sq. cms. A voltage of 3.00 volt is applied between the electrodes for two hours and 22 minutes. The current through the electrolysis vessel decreases from 156 ma. to 132 ma. As a result of this treatment the precipitate is grown through the wafer. The grown-through part is removed and the wafer is now clamped against the diaphragm in the partition with the side from which the precipitate is removed. After filling the electrolysis vessel, a voltage of 3.00 volt is applied between the electrodes for 33 minutes. The current through the electrolysis vessel decreases from 160 ma. to 136 ma. Subsequently the resulting positive electrode is rinsed in deionized water and placed in a 20% KOH-solution.

Of the resulting electrode the edges which have been clamped in, were first cut off. The electrode was placed in 20% KOH-solution and then charged and discharged three times with 100 ma. and 75 ma., respectively, and then once with 100 ma. and 19 ma. respectively. The measured capacities were 80, 71, 71 and 83 ma., respectively. The last-mentioned value corresponds to 0.28 ah. (ampere-hours) per ccm. of electrode.

(2) A negative electrode was manufactured in the same manner in which a 1 molar $Cd(NO_3)_2$-solution was provided in the cell instead of an $Ni(NO_3)_2$-solution and instead of the enveloped nickel electrode, an equally large nonenveloped cadmium electrode. A voltage of 2.50 v. was applied between the electrodes for 2 hours and 34 minutes. The current decreased from 135 ma. to 65 ma. After the same treatment as described in Example 1 for a nickel electrode, a voltage of 2.50 volt was applied for another 35 minutes, the current decreasing from 122 ma. to approximately 60 ma.

Of this electrode also the edges were cut off. It was charged and discharged as described in Example 1. The measured capacities were 116, 123, 119 and 122 mah., respectively. The last-mentioned value corresponds to 0.41 ah./ccm. of electrode.

(3) Electrodes were also manufactured in such a manner that it is not necessary to turn the wafers during filling while all the same electrodes are obtained having at least equally high capacities as described above.

Starting from an approximately 0.6 mm. thick wafer, a nickel oxide electrode was obtained as follows, in which a wafer is used as the diaphragm which was previously filled on one side with a layer of $Ni(OH)_2$ and which further contained an alkalihydroxide-solution thickened with agar-agar. As a result of the presence of this $Ni(OH)_2$ no $Ni^{++}$ ions can penetrate in or through the diaphragm when the diaphragm is subsequently used. The wafer to be filled is previously impregnated with a 1 molar $Ni(NO_3)_2$ solution. After clamping in the partition the electrolysis vessel was filled on the side of the diaphragm with a 0.8 m. $KOH + 1.6$ m. $KNO_3$-solution and on the side of the wafer to be filled with a 1 molar $Ni(NO_3)_2$-solution. A voltage of 3.00 volt was applied for 5 hours. The current decreased from 159 ma. to 100 ma. In order to purify the electrode from $NO_3^-$ it was first cathodically reduced in 20% KOH-solution. If this is not done, the electrode has an additionally high capacity during the first discharge. The resulting electrode was charged and discharged two times with 100 and 75 ma., respectively. The measured capacities were 86 mah. each. This corresponds to 0.29 ah./ccm. of electrode.

The same capacity can be obtained when the precipitate is formed only by diffusion, so without an electric field. For skeletons, thickness 0.5 mm., a time of approximately 15 hours is required for this purpose.

What is claimed is:
1. A method of manufacturing electrodes by precipitating an electrochemically active compound in the pores of a porous electrode skeleton comprising the steps, placing the electrode skeleton between and in contact with two solutions each containing a reaction component from which an active substance is formed, positioning an ancillary diaphragm adjacent one side of said electrode skeleton, said diaphragm being permeable to the reaction components but preventing mixing of the solutions used and precipitating the active substance in said skeleton.

2. A method as claimed in claim 1 wherein the ancillary diaphragm is positioned adjacent that side of the electrode skeleton where the solution of the reaction component which is transported by the precipitate is located.

3. A method as claimed in claim 2 wherein the ancillary diaphragm conducts electrons.

4. A method as claimed in claim 1 for manufacturing an active nickel oxide-hydrate-containing electrode, wherein the porous electrode skeleton and the two solutions are positioned in an electric field between an anode electrode and a cathode electrode in which cations are located on the anode side and anions which react with cations are located on the cathode side, the electrolyte solution surrounding the anode electrode containing Cl-ions a cation-selective diaphragm being arranged between the anode and the electrode skeleton.

References Cited

UNITED STATES PATENTS

| | | | |
|---|---|---|---|
| 938,451 | 10/1909 | Aylsworth | 136—28.1 XR |
| 2,880,257 | 3/1959 | Murphy et al. | 136—29 |
| 3,006,821 | 10/1961 | Haring | 204—38 |
| 3,203,879 | 8/1965 | Mueller | 136—29 XR |
| 3,281,272 | 10/1966 | Ackermann et al. | 136—29 |
| 3,282,808 | 11/1966 | Kandler | 204—37 |
| 3,335,033 | 8/1967 | Kober | 136—29 |

WINSTON A. DOUGLAS, Primary Examiner

A. SKAPARS, Assistant Examiner

U.S. Cl. X.R.

136—68, 76; 204—56, 112